US012695872B2

(12) United States Patent
Chen et al.

(10) Patent No.: US 12,695,872 B2
(45) Date of Patent: Jul. 28, 2026

(54) EXTENDED BLOCK PARTITION TYPES FOR VIDEO CODING

(71) Applicant: MEDIATEK INC., Hsinchu City (TW)

(72) Inventors: Hong-Hui Chen, Hsinchu City (TW);
Chun-Chia Chen, Hsinchu City (TW);
Shih-Ta Hsiang, Hsinchu City (TW);
Chia-Ming Tsai, Hsinchu City (TW);
Chih-Wei Hsu, Hsinchu City (TW);
Tzu-Der Chuang, Hsinchu City (TW);
Ching-Yeh Chen, Hsinchu City (TW);
Yu-Wen Huang, Hsinchu City (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 18/846,549

(22) PCT Filed: Apr. 10, 2023

(86) PCT No.: PCT/CN2023/087323
§ 371 (c)(1),
(2) Date: Sep. 12, 2024

(87) PCT Pub. No.: WO2023/197998
PCT Pub. Date: Oct. 19, 2023

(65) Prior Publication Data
US 2025/0193394 A1      Jun. 12, 2025

Related U.S. Application Data

(60) Provisional application No. 63/330,343, filed on Apr. 13, 2022.

(51) Int. Cl.
H04N 19/119        (2014.01)
H04N 19/157        (2014.01)
(Continued)

(52) U.S. Cl.
CPC ......... H04N 19/119 (2014.11); H04N 19/157 (2014.11); H04N 19/159 (2014.11);
(Continued)

(58) Field of Classification Search
None
See application file for complete search history.

(56) References Cited

U.S. PATENT DOCUMENTS 10,230,961 B2    3/2019  Liu
11,589,064 B2    2/2023  Nam
(Continued)

FOREIGN PATENT DOCUMENTS

CN        104754362 A      7/2015
CN        108028925 A      5/2018
(Continued)

OTHER PUBLICATIONS

International Search Report and Written Opinion dated May 23, 2023, issued in application No. PCT/CN2023/087323.
(Continued)

*Primary Examiner* — Lindsay J Uhl
(74) *Attorney, Agent, or Firm* — McClure, Qualey & Rodack, LLP

(57) ABSTRACT

A method for signaling arbitrary partition boundaries is provided. A video coder derives a partitioning structure for splitting the current block by identifying a partitioning position having a lowest cost. The video coder splits the current block into first and second partitions according to the identified partitioning position. The video coder encodes or decodes the first and second partitions of the current block. The first and second partitions may be associated with first and second templates that are constructed based on reconstructed pixels neighboring the current block. The video coder may identify the partitioning position by computing a
(Continued)

1000 first cost based on the first template and a second cost based on the second template and optimizing the partitioning position to minimize a sum of the first and second costs.

12 Claims, 13 Drawing Sheets

(51) Int. Cl.

| | |
|---|---|
| *H04N 19/159* | (2014.01) |
| *H04N 19/176* | (2014.01) |
| *H04N 19/182* | (2014.01) |
| *H04N 19/543* | (2014.01) |
| *H04N 19/70* | (2014.01) |

(52) U.S. Cl.
CPC ......... *H04N 19/176* (2014.11); *H04N 19/182* (2014.11); *H04N 19/543* (2014.11); *H04N 19/70* (2014.11)

(56) References Cited

U.S. PATENT DOCUMENTS

| | | | |
|---|---|---|---|
| 11,595,677 B2 | 2/2023 | Zhao | |
| 2013/0003855 A1 | 1/2013 | Park | |
| 2013/0044814 A1 | 2/2013 | Guo | |
| 2017/0085886 A1 | 3/2017 | Jacobson | |
| 2017/0366812 A1* | 12/2017 | Abbas | H04N 13/161 |
| 2018/0199072 A1 | 7/2018 | Li | |
| 2018/0255315 A1 | 9/2018 | Edpalm | |
| 2019/0335181 A1 | 10/2019 | Abe | |
| 2019/0387226 A1 | 12/2019 | Lee | |
| 2019/0394491 A1 | 12/2019 | Han | |
| 2020/0413102 A1 | 12/2020 | Hsiang | |

| | | | |
|---|---|---|---|
| 2021/0021848 A1 | 1/2021 | Nam | |
| 2021/0067809 A1 | 3/2021 | Du | |
| 2022/0279163 A1 | 9/2022 | Park | |
| 2022/0312003 A1 | 9/2022 | Lee | |
| 2022/0360777 A1 | 11/2022 | Choi | |
| 2023/0231992 A1* | 7/2023 | Chen | H04N 19/132 |
| | | | 375/240.02 |
| 2024/0298855 A1* | 9/2024 | Zhao | A47L 9/0494 |

FOREIGN PATENT DOCUMENTS

| | | |
|---|---|---|
| CN | 112019844 A | 12/2020 |
| CN | 112166606 A | 1/2021 |
| TW | 201804805 A | 2/2018 |
| WO | 2020175908 A1 | 9/2020 |
| WO | 2022019613 A1 | 1/2022 |

OTHER PUBLICATIONS

Chinese language office action dated Apr. 2, 2024, issued in application No. TW 112113553.
Browne, A., et al.; "Algorithm description for versatile video coding and test model 16 (VTM 16);" Joint Video Experts Team (JVET) of ITU-T SG 16 WP 3 and ISO/IEC JTC 1/SC 29; Jan. 2022; pp. 1-127.
International Search Report and Written Opinion dated Jul. 24, 2023, issued in application No. PCT/CN2023/087459.
Chinese language office action dated Nov. 13, 2023, issued in application No. TW 112113622.
Extended European Search Report dated Feb. 11, 2026, issued in application No. EP 23787642.0.
C-C Chen, et al.; "Non-EE2: Template matching based reordering for GPM split modes;" Joint Video Experts Team (JVET) of ITU-T SG 16 WP 3 and ISO/IEC JTC 1/SC 29; Jan. 2022; pp. 1-3.

\* cited by examiner

SPLIT_QT

SPLIT_BT_VER          SPLIT_BT_HOR          SPLIT_TT_VER          SPLIT_TT_HOR

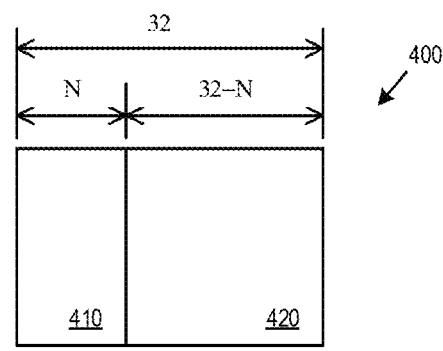
FIG. 4
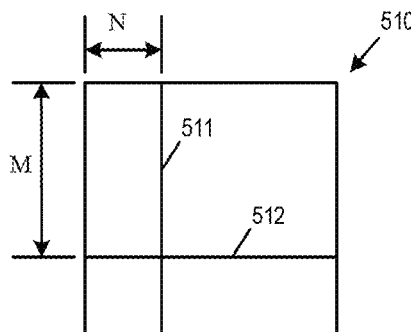
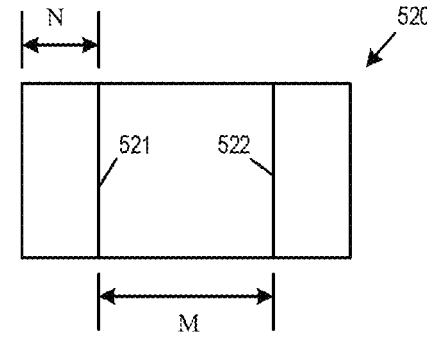
FIG. 5
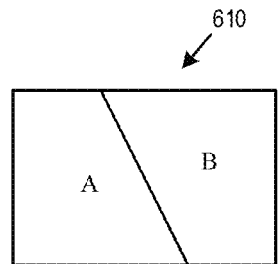
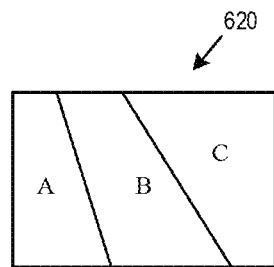
FIG. 6A          FIG. 6B

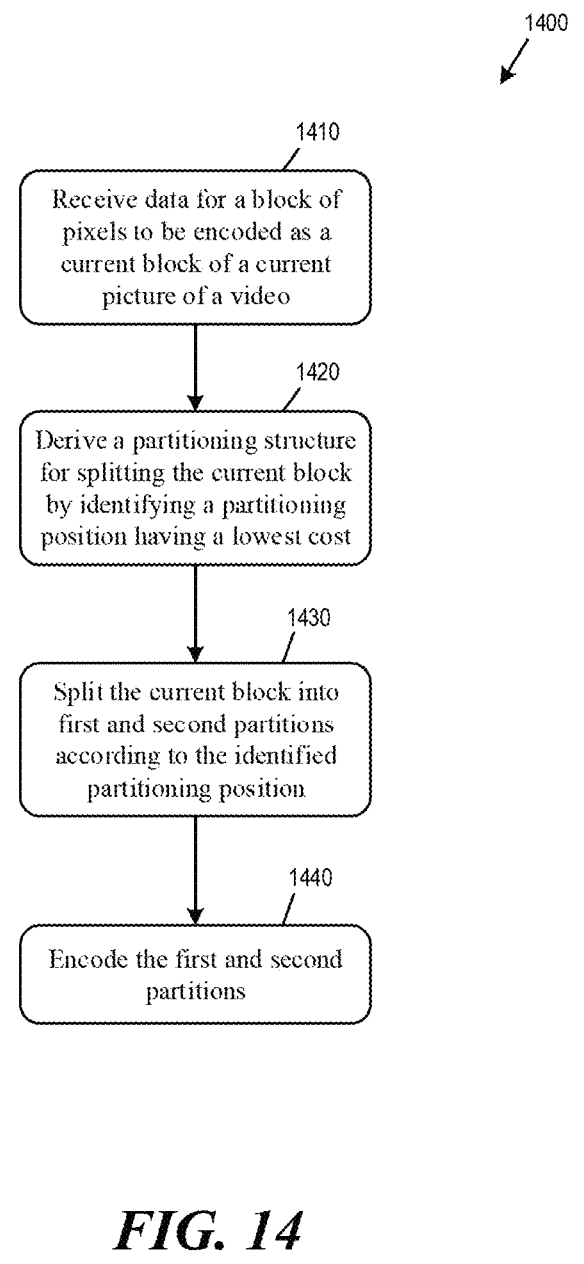

1400

1410

Receive data for a block of
pixels to be encoded as a
current block of a current
picture of a video

1420

Derive a partitioning structure
for splitting the current block
by identifying a partitioning
position having a lowest cost

1430

Split the current block into
first and second partitions
according to the identified
partitioning position

1440

Encode the first and second
partitions

*FIG. 14*

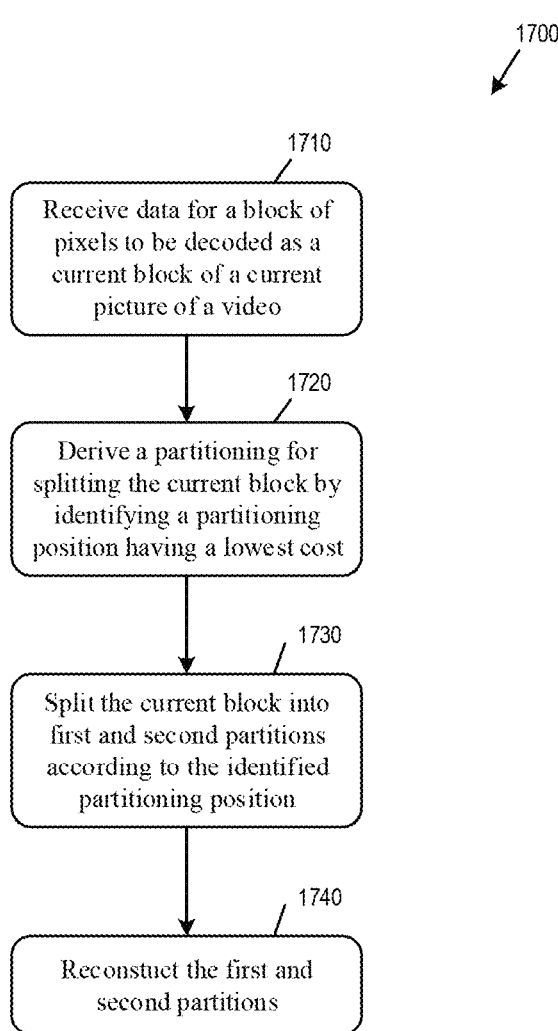

1700

1710

Receive data for a block of pixels to be decoded as a current block of a current picture of a video

1720

Derive a partitioning for splitting the current block by identifying a partitioning position having a lowest cost

1730

Split the current block into first and second partitions according to the identified partitioning position

1740

Reconstuct the first and second partitions

*FIG. 17*

EXTENDED BLOCK PARTITION TYPES FOR VIDEO CODING

CROSS REFERENCE TO RELATED PATENT APPLICATION(S)

The present disclosure is part of a non-provisional application that claims the priority benefit of U.S. Provisional Patent Application No. 63/330,343, filed on 13 Apr. 2022. Content of above-listed application is herein incorporated by reference.

TECHNICAL FIELD

The present disclosure relates generally to video coding. In particular, the present disclosure relates to methods of partitioning a block of pixels for coding.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

Versatile video coding (VVC) is the latest international video coding standard developed by the Joint Video Expert Team (JVET) of ITU-T SG16 WP3 and ISO/IEC JTC1/SC29/WG11. The input video signal is predicted from the reconstructed signal, which is derived from the coded picture regions. The prediction residual signal is processed by a block transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In VVC, a coded picture is partitioned into non-overlapped square block regions represented by the associated coding tree units (CTUs). The leaf nodes of a coding tree correspond to the coding units (CUs). A coded picture can be represented by a collection of slices, each comprising an integer number of CTUs. The individual CTUs in a slice are processed in raster-scan order. A bi-predictive (B) slice may be decoded using intra prediction or inter prediction with at most two motion vectors and reference indices to predict the sample values of each block. A predictive (P) slice is decoded using intra prediction or inter prediction with at most one motion vector and reference index to predict the sample values of each block. An intra (I) slice is decoded using intra prediction only.

A CTU can be partitioned into one or multiple non-overlapped coding units (CUs) using the quadtree (QT) with nested multi-type-tree (MTT) structure to adapt to various local motion and texture characteristics. A CU can be further split into smaller CUs using one of the five split types: quad-tree partitioning, vertical binary tree partitioning, hori-zontal binary tree partitioning, vertical center-side triple-tree partitioning, horizontal center-side triple-tree partitioning.

Each CU contains one or more prediction units (PUs). The prediction unit, together with the associated CU syntax, works as a basic unit for signaling the predictor information. The specified prediction process is employed to predict the values of the associated pixel samples inside the PU. Each CU may contain one or more transform units (TUs) for representing the prediction residual blocks. A transform unit (TU) is comprised of a transform block (TB) of luma samples and two corresponding transform blocks of chroma samples and each TB correspond to one residual block of samples from one color component. An integer transform is applied to a transform block. The level values of quantized coefficients together with other side information are entropy coded in the bitstream. The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU.

For each inter-predicted CU, motion parameters consisting of motion vectors, reference picture indices and reference picture list usage index, and additional information are used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU. The alternative to merge mode is the explicit transmission of motion parameters, where motion vector, corresponding reference picture index for each reference picture list and reference picture list usage flag and other needed information are signalled explicitly per each CU.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments provide a method for signaling arbitrary partition boundaries. A video coder derives a partitioning structure for splitting the current block by identifying a partitioning position having a lowest cost. The video coder may signal the identified partitioning position. The video coder splits the current block into first and second partitions according to the identified partitioning position. The video coder encodes or decodes the first and second partitions of the current block.

In some embodiments, the first and second partitions may be associated with first and second templates that are constructed based on reconstructed pixels neighboring the current block. The video coder may identify the partitioning position by computing a first cost based on the first template and a second cost based on the second template and optimizing the partitioning position to minimize a sum of the first and second costs. The video coder may compute the first cost by matching the first template with a first set of reference pixels in the current picture identified by a first intra prediction mode of the first partition, and the second cost by matching the second template with a second set of reference pixels in the current picture identified by a second intra prediction mode of the second partition. The video coder may compute the first cost by matching the first template with a first set of reference pixels in a first reference picture identified by a first motion vector of the first partition and the second cost by matching the second template with a second set of reference pixels in a second reference picture identified by a second motion vector of the second partition.

The partitioning position may be used to specify a partition boundary for quadtrec (QT), binary tree (BT), or ternary tree (TT). The partitioning structure may specify an offset and an angle of a straight line that splits the current block (e.g., GPM-like). The width and height of the current block may be power-of-two integers while the partitioning position is at a non-power-of-two integer pixel position. The first partition may be a first rectangular region at a corner of the current block and the second partition is an L-shaped remainder region of the current block minus the first partition. The first partition may be a first rectangular region entirely within the current block and the second partition is a remainder region of the current block that surrounds the first rectangular region on four sides.

In some embodiments, when the partition does not have a corresponding transform kernel (e.g., having dimensions that are not power-of-two), the samples of the first or second partition may be encoded as prediction residuals without being transformed (transform skip), or the samples of the first or second partition may be encoded by prediction without signaling prediction residuals (residue skip).

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIG. 4 illustrates binary tree (BT) partitioning with arbitrary boundaries.

FIG. 5 illustrates arbitrary boundary partitioning for quad trec (QT) and ternary tree (TT).

FIGS. 6A-B illustrate partitioning of blocks by arbitrary straight lines.

FIG. 14 conceptually illustrates a process for deriving partitioning position for arbitrary partitioning.

FIG. 17 conceptually illustrates a process for deriving partitioning position for arbitrary partitioning.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Block Partitioning

Figure 1:
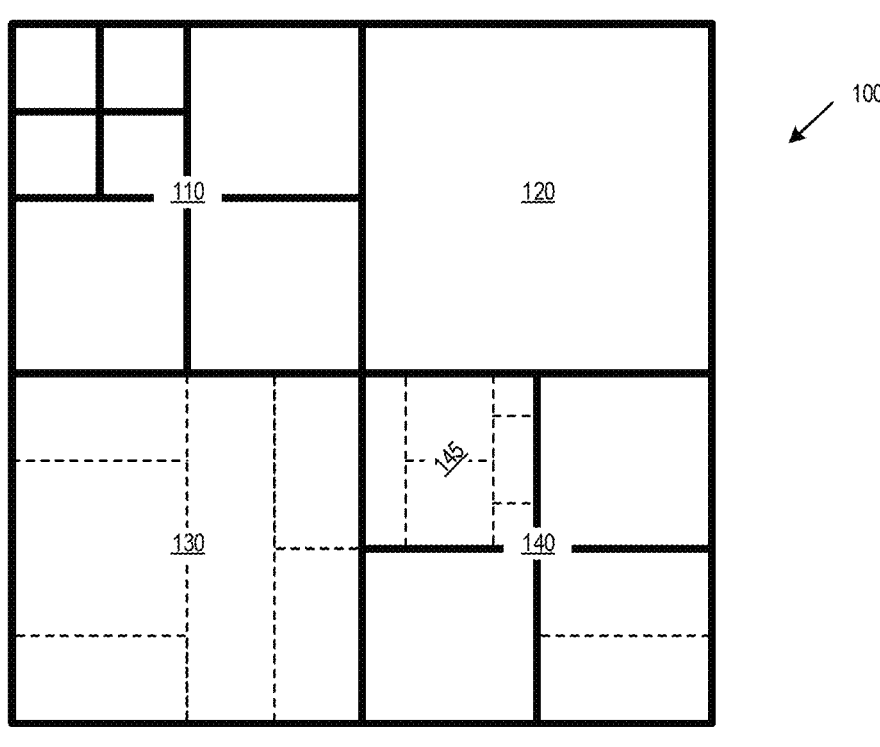
FIG. 1 provides an example coding tree unit (CTU) that is recursively partitioned.

A CTU can be partitioned into one or multiple non-overlapped coding units (CUs) using the quadtree (QT) with nested multi-type-tree (MTT) structure to adapt to various local motion and texture characteristics. FIG. 1 provides an example CTU 100 that is recursively partitioned by QT with nested MTT. In the figure, the bold solid edges represent quadtree partitioning and the broken edges represent multi-type tree (MTT) partitioning. As illustrated, the CTU 100 is partitioned by QT into CUs 110, 120, 130, and 140. The CU 110 is further partitioned by QT. The CU 120 is not further partitioned. The CU 130 is further partitioned by MTT. The CU 140 is further partitioned by QT and then by MTT.

Figure 2:
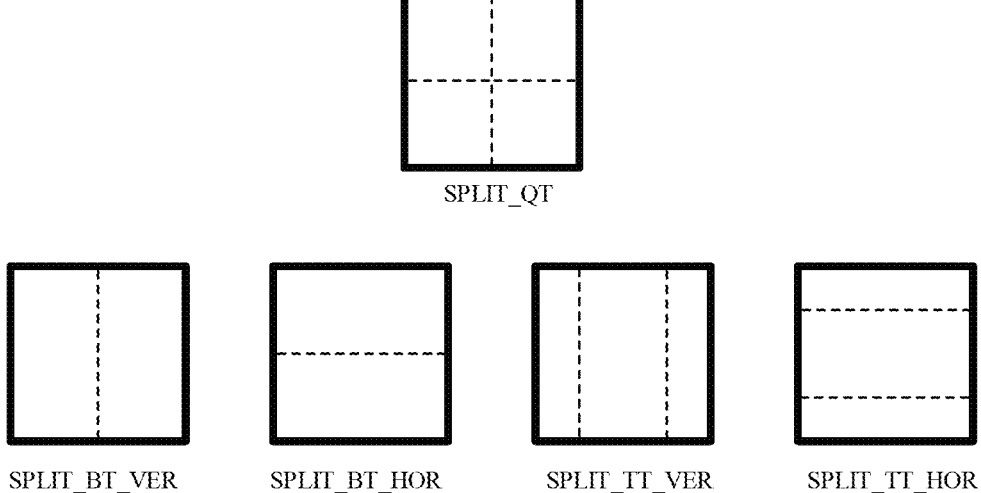
FIG. 2 illustrates the five split types of a coding unit (CU).

FIG. 2 illustrates the five split types of a CU, including by QT partitioning and by MTT partitioning. As illustrated, the CU can be further split into smaller CUs by using QT partitioning (SPLIT_QT), or by using one of the four MTT partitioning types: vertical binary partitioning (SPLIT_BT_VER), horizontal binary partitioning (SPLIT_BT_HOR), vertical ternary partitioning (SPLIT_TT_VER), horizontal ternary partitioning (SPLIT_TT_HOR).

The following parameters are defined for the quadtree with nested multi-type tree coding tree scheme. These parameters are specified by sequence parameter set (SPS) syntax elements and can be further refined by picture header syntax elements.

CTUsize: the root node size of a quaternary tree

MinQTSize: the minimum allowed quaternary tree leaf node size.

MaxBtSize: the maximum allowed binary tree root node size.

MaxTtSize: the maximum allowed ternary tree root node size.

Figure 3:
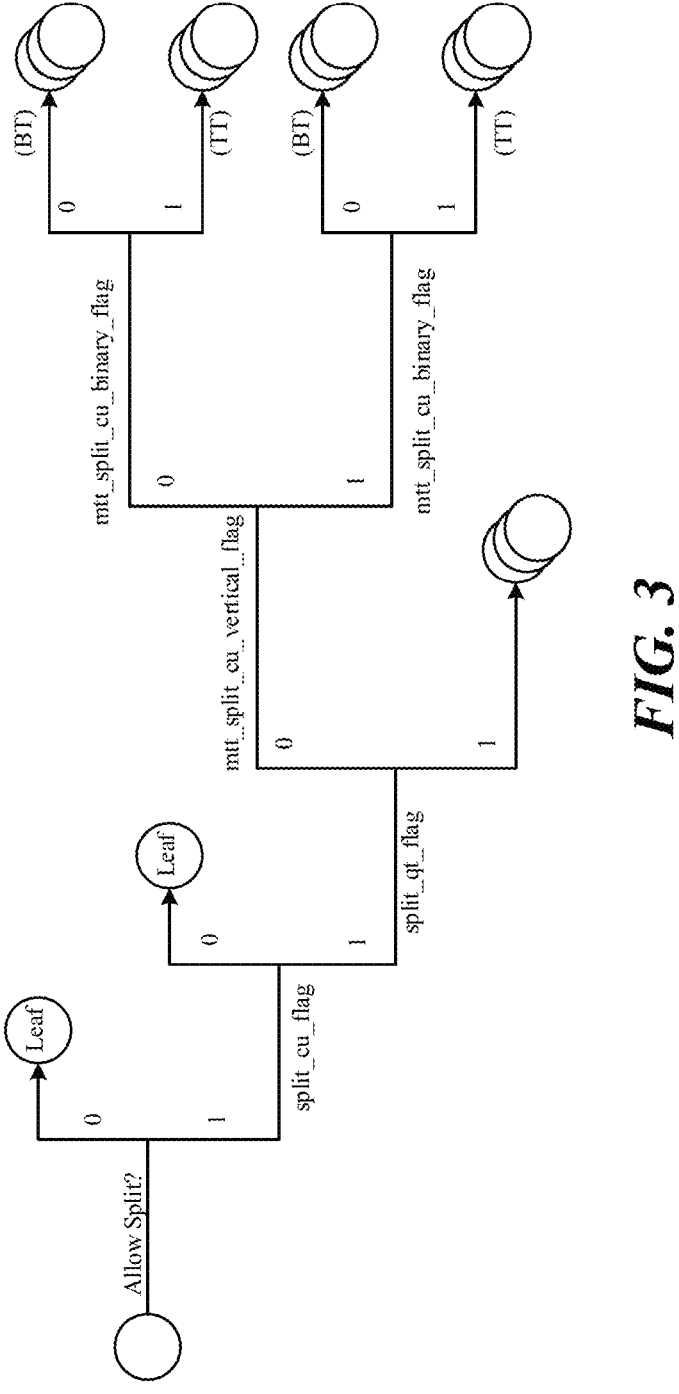
FIG. 3 illustrates the signaling mechanism of the partition splitting information.

MaxMttDepth: the maximum allowed hierarchy depth of multi-type tree splitting from a quadtree leaf MinCbSize: the minimum allowed coding block node size A coding tree unit (CTU) is treated as the root of a quaternary tree (or quadtree) and is first partitioned by a quaternary tree structure. Each quaternary tree leaf node (when sufficiently large to allow it) is then further partitioned by a multi-type tree structure. FIG. 3 illustrates the signaling mechanism of the partition splitting information, specifically for quadtree with nested multi-type tree coding tree structure. The figure illustrates splitting flags that are used to indicate the partition tree structure of a block. Specifically, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU is derived as below:

| MttSplitMode | mtt_split_cu_vertical_flag | mtt_split_cu_binary_flag |
| --- | --- | --- |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

II. Extended Partitioning

A. Arbitrary Boundary Splitting for BT

Some embodiments of the disclosure provide arbitrary BT splitting. Arbitrary BT can have any splitting boundary position. FIG. 4 illustrates BT partitioning with arbitrary boundaries. As illustrated, for a CU 400 that is 32×32 in size, an arbitrary horizontal BT splitting may partition the CU into 2 sub-CUs 410 and 420, one is 32×N, another is 32×(32-N), where N is an integer between 1 and 31.

In some embodiments, some splitting dimensions for arbitrary boundary BT splitting are not allowed. For example, splitting a 32×32 block into 7×32 and 25×32 partitions is not allowed for intra-coding, but splitting a 32×32 block into 16×32 and 16×32 partitions is allowed for intra-coding. The allowed partitioning are the ones with the block's width or height being a power-of-2 number, such that the existing transform kernels can be applied on these partitions or sub-CUs to complete the coding process.

B. Arbitrary Boundary Splitting for TT and QT

Arbitrary boundary can be applied to other types of block partitioning, such as TT and QT. FIG. 5 illustrates arbitrary boundary partitioning for TT and QT. In the figure, a first block 510 is QT-split by arbitrary boundaries 511 and 512, and a second block 520 is TT-split along arbitrary boundaries 521 and 522. The arbitrary boundaries are defined by widths M and N. In some embodiments, the partitioning (or splitting) position (the M or N values) can be signaled from encoder to decoder. In some embodiments, the partitioning position can be derived at the decoder side by a template-matching method (described by reference to FIG. 7A-B below.)

In some embodiments, intra-coded or inter-coded blocks may be partitioned by arbitrary TT or QT boundaries in order to simplify the coding operations. In some embodiments, partitions created by arbitrary TT or QT boundaries are coded by using residue skip mode or transform skip mode in order to simplify or bypass transform operations. A partition coded by transform skip mode has its prediction residual coded and signaled without being transformed into another domain (e.g., the transform step is skipped). A partition coded by residue skip mode has only its prediction information (e.g., inter prediction motion information, intra prediction direction) signaled without signaling the prediction residual (the residual generation step is skipped). In some embodiments, some splitting dimensions for arbitrary boundary TT or QT splitting are not allowed for intra-coding. The allowed partitioning are the ones with the block's width or height being a power-of-2 number, such that the existing transform kernels can be applied on these partitions or sub-CUs to complete the coding process.

C. GPM-like Partitioning

In some embodiments, the parent block can be partitioned into two or more parts by a partition boundary that is tilted (not horizontal boundary or vertical boundary). Such a partition boundary can be an arbitrary straight line specified by an angle parameter and an offset parameter, i.e., in a manner similar to geometric partitioning mode (GPM). FIGS. 6A-B illustrate partitioning of blocks by arbitrary straight lines. FIG. 6A illustrates two-way partitioning of a block 610 into parts A and B. The partitions A and B may be different CUs with separate coding flows, such as separate coding modes, separate candidate lists, and/or separate residual coding. The residual coding may be applied along with the transform skip. Otherwise residue skip can be applied for the partitioned block to complete the coding process.

In some embodiments, Picture/Tile/Slice/CTU-row/CTU header may be used to turn on or off the GPM-like partitioning. A video coder may set the partitioning control based on content-dependent characteristics. For example, an encoder may perform a picture analysis (e.g., MV field analysis) to determine whether to turn on the GPM-like partitioning, or not.

In some embodiments, TT splitting may also be GPM-like, such that two tilted straight lines may divide the CU into three parts. FIG. 6B illustrates three-way partitioning of a block 620 into parts A, B, and C. Since partitions created by GPM-like partitioning are non-power-of-two blocks, residue skip and/or transform skip may be used to encode the partitions.

D. Implicitly Derived Arbitrary Partitioning Position

Figure 7A:
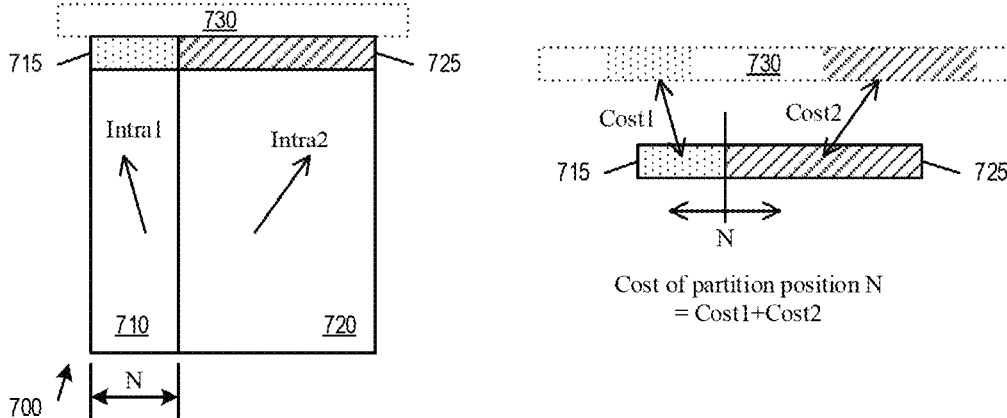
FIGS. 7A-B conceptually illustrate a template matching method for deriving a partitioning position for a current block.
Figure 7B:
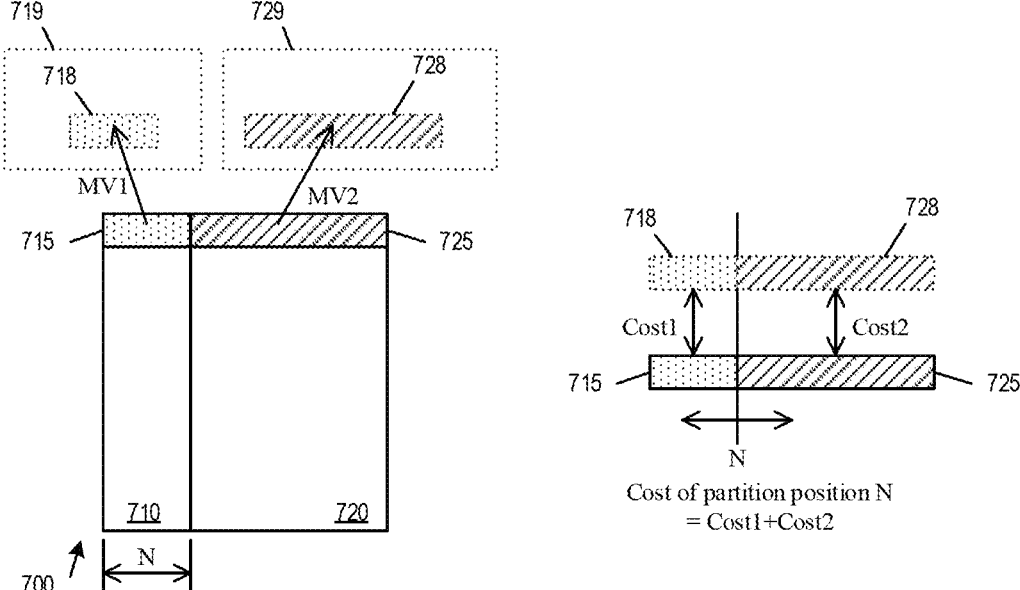

In some embodiment, the partitioning position (e.g., the N value) can be signaled explicitly from encoder to decoder. In some embodiments, the partitioning position can be implicitly derived at decoder side by a template-matching method. FIGS. 7A-B conceptually illustrate a template matching method for deriving a partitioning position for a current block 700. The current block is BT-split by an arbitrary partitioning position N into partitions 710 and 720. The partition 710 has a corresponding template 715 of already reconstructed neighboring samples, the partition 720 has a corresponding template 725 of already reconstructed neighboring samples.

FIG. 7A illustrates deriving partitioning position for when the current block 700 is intra-coded. As illustrated, the partition 710 is intra coded by a first intra prediction direction or mode (intra1) and the partition 720 is intra coded by a second intra prediction direction or mode (intra2). (The two partitions may also share a same intra prediction direction or mode.) The intra prediction direction "intra1" is used identify neighboring pixels 730 for matching with the template 715 to generate a matching cost "cost1". The intra prediction direction "intra2" is used identify neighboring pixels 730 for matching with the template 725 to generate a matching cost "cost2". The matching costs "cost1" and "cost2" are added together to compute a cost for using a particular value of N as the partitioning position for splitting the block 700. Both encoder and decoder would independently derive the N value that results in the lowest cost1+cost2 value as the partitioning position for the block 700.

FIG. 7B illustrates deriving partitioning position for when the current block 700 is inter-coded. As illustrated, the partition 710 is inter coded by a first motion vector (MV1) and the partition 720 is inter coded by a second motion vector (MV2). (The two partitions may also share a same motion vector.) The motion vector MV1 is used to identify a set of reference pixels 718 that correspond to the template 715 in a reference picture 719, while the motion vector MV2 is used to identify a set of reference pixels 728 that correspond to the template 725 in a reference picture 729. The reference pixels 718 is used to generate a matching cost "cost1" against the template 715, while the reference pixels 728 is used to generate a matching cost "cost2" against the template 725. Cost1 and Cost2 are added together to compute a cost for using a particular value of N as the partitioning position for splitting the block 700. Both encoder and decoder would independently derive the N value that results in the lowest cost1+cost2 value as the partitioning position for the block 700.

The BT partitioning with arbitrary boundary is beneficial for many different types of video content, because object boundaries often do not land in the middle of a parent block (conventional VBT, HBT case cannot perfectly match). In some embodiments, arbitrary boundary BT splitting can be turned on or off for different granularity levels, e.g., CTU/ CTU-Row/Tile/Slice/Picture/GOP (group of pictures).

In some embodiments, the arbitrary BT boundary (e.g., non-power-of-2) is allowed only for blocks coded by residue or transform skip modes in order to simplify or bypass transform operations. In some embodiments, arbitrary BT boundary is allowed for blocks coded by inter-mode in order to simplify the coding operations.

In some embodiments, some splitting dimensions for implicitly derived arbitrary boundary BT splitting are not allowed. For example, splitting a 32×32 block into 7×32 and 25×32 partitions is not allowed for intra coding, but splitting a 32×32 block into 16×32 and 16×32 partitions is allowed for intra-coding. The allowed partitioning are the ones with block's width or height still be power-of-2 number, such that the existing transform kernels can be applied on these partitions or sub-CUs to complete the coding process.

E. Corner Partition

Figure 8:
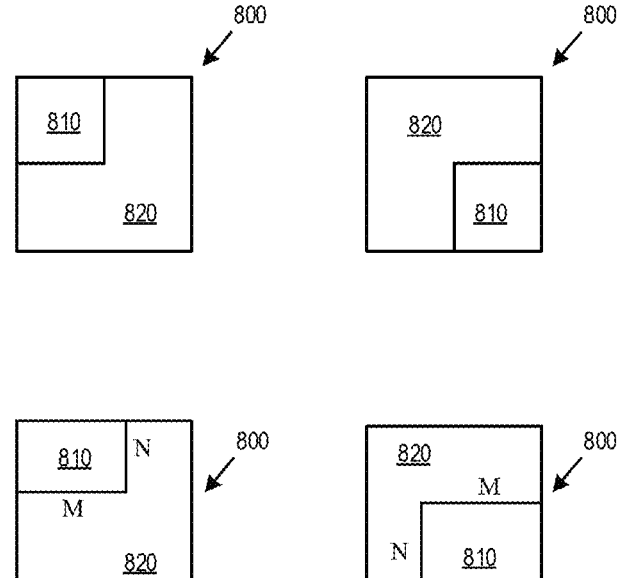
FIG. 8 illustrates partitioning a parent block into a corner block and a L-shaped remainder.

In some embodiments, a parent CU may be partitioned into 2 partitions such that one partition is a corner-rectangular block while the other partition is the remaining L-shape partition. FIG. 8 illustrates partitioning a parent block 800 into a corner block 810 and a L-shaped remainder 820. The ratio between the parent block and the corner-block 810 can be 2:1, 4:1 or another ratio. In some embodiments, the partitioning position (the N or M value) can be signaled from encoder to decoder. In some embodiments, the partitioning position can be derived at the decoder side by a template-matching method described by reference to FIG. 7A-B above.

In some embodiments, the residual transform of the L-shape partition 820 can be performed by padding the L-shape into a rectangle and transformed by conventional transform kernels. In some embodiments, the residual transform may be performed by dividing the L-shaped partition 820 into two rectangular sub-residual-blocks and perform the transform separately. In some embodiments, the residual transform of the L-shape partition 820 can be performed by using one special-designed L-shape transform kernel, and the video coder may adaptively select transform kernels according to the length of the row or column. In some embodiments, the L-shaped partition is coded by using residue skip or transform skip.

Figure 9:
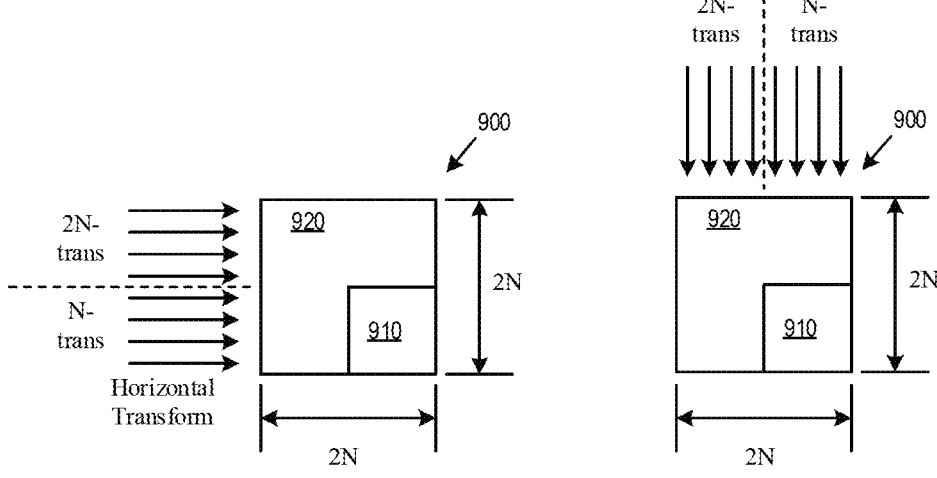
FIG. 9 conceptually illustrates parameters of the L-shaped partition that can be used for selecting a transform kernel.

FIG. 9 conceptually illustrates parameters of the L-shaped partition that can be used for selecting a transform kernel. The figure illustrates a CU 900 that is 2N×2N. The CU 900 has a corner partition 910 that is N×N, and a L-shaped remainder portion 920. When applying horizontal transform to the CU 900, the upper portion of the L-shape 920 is first applied with a transform kernel of 2N in width and the lower portion is applied with a transform kernel of N in width. In a similar way, when applying vertical transform to the CU 900, the left portion is first applied with a transform kernel of 2N in height and the right portion is applied with a transform kernel of N in height.

F. Block Inside a Larger Block

Figure 10:
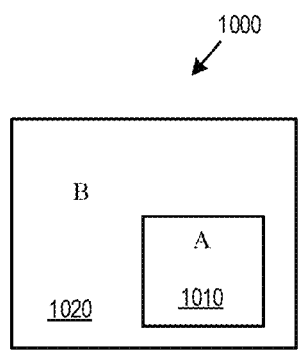
FIG. 10 illustrates a block that is partitioned by block-inside-larger block partitioning.

In some embodiments, a "block inside large block" partitioning may be used. FIG. 10 illustrates a block that is partitioned by block-inside-larger block partitioning. As illustrated, a CU 1000 is partitioned into an inner rectangle part 1010 and an outer surrounding remainder part 1020. The block-inside-larger-block partitioning can facilitate coding gain for certain types of content, content that cannot be easily partitioned by BT/QT/TT. In some embodiments, the position of the inner rectangular part 1010 (e.g., as offset relative to left-top corner of the parent block) is signaled from encoder to decoder.

In some embodiments, the residual transform of the outer surrounding part 1020 can be performed by filling the hole in the middle to create a rectangle to be transformed by conventional transform. In some embodiments, the residual transform may be performed by dividing the outer surrounding part 1020 into several rectangular sub-residual-blocks and perform the transform separately. In some embodiments, the residual transform of the outer surrounding part 1020 can be performed by using one special-designed outer surrounding transform kernel, and the video coder may adaptively select transform kernels according to the length of the row or column. In some embodiments, the outer surrounding partition 1020 is coded by using skip method, such as residue skip or transform skip.

G. Splitting-Flag Prediction by Neural Networks

Figure 11:
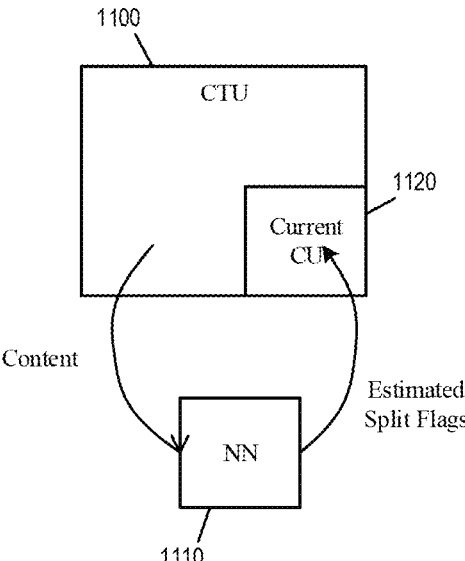
FIG. 11 conceptually illustrates using a neural network to predict the splitting flag for partitioning a block of pixels.

In some embodiments, neural networks (NN) are used to predict the splitting flags for one parent CU, splitting flags such as the ones introduced in Section I above. FIG. 11 conceptually illustrates using a neural network to predict the splitting flag for partitioning a block of pixels. As illustrated, the content of a CTU 1100 is used as input to a neural network 1110. A current CU region 1120 is not available as input to the neural network 1110 at the decoder side because the CU 1120 has not been decoded yet. After the neural network analysis, the splitting flags are generated based entirely or partially on the result generated by the neural network 1110. The Current CU region 1120 can be further split based on the predicted splitting flags.

The input for the neural network is a large range of pixels of neighboring samples of a current region, and the output of the network is the estimated prediction results of splitting flags for the current region. The current parent-CU is the current region for whom the splitting flags are to be predicted. The predicted splitting flags are used to determine how to split the current "parent-CU".

In some embodiments, the neural network for the splitting flag prediction is implemented and applied at the decoder side. In some embodiments, the decoder makes its splitting decision partially based on the prediction result. In other words, the decoder relies on information explicitly signaled by the encoder as well as the splitting flags prediction produced by the neural network. For example, the encoder may send only BT splitting flags to the decoder without explicit signaling for HBT or VBT. The decoder makes the partitioning decision between HBT and VBT based on the neural network output.

In some embodiments, the neural network prediction results are used by the encoder and the decoder to determine an ordering among all splitting directions, and the encoder may then signal an index to indicate a splitting direction based on the neural network determined ordering. In some embodiments, HBT and VBT splitting decisions are initially sorted by neural network prediction results. For example, if after sorting, HBT is better than VBT, then HBT is designated by index 0 and VBT is designated by index 1 by both encoder and decoder. The encoder may signal index 0, and this is understood by the decoder to select HBT. This reordering scheme is used to reduce syntax rates for signaling splitting flags after context coding (e.g., CABAC coding).

The neural network can also be applied to determine the splitting position under the asymmetric partitioning modes (ABT/AQT/ATT). The neural network provides an alternative method to the template-based methods for deciding the position of CU splitting described above.

The foregoing proposed method can be implemented in encoders and/or decoders. For example, the proposed method can be implemented in a inter coding module of an encoder, and/or a inter coding module of a decoder. For example, the proposed method can be implemented in an intra coding module of an encoder, and/or an intra coding module of a decoder. For example, the proposed method can be implemented in a tree-splitting coding module of an encoder, and/or a tree-splitting coding module of a decoder.

III. Example Video Encoder

Figure 12:
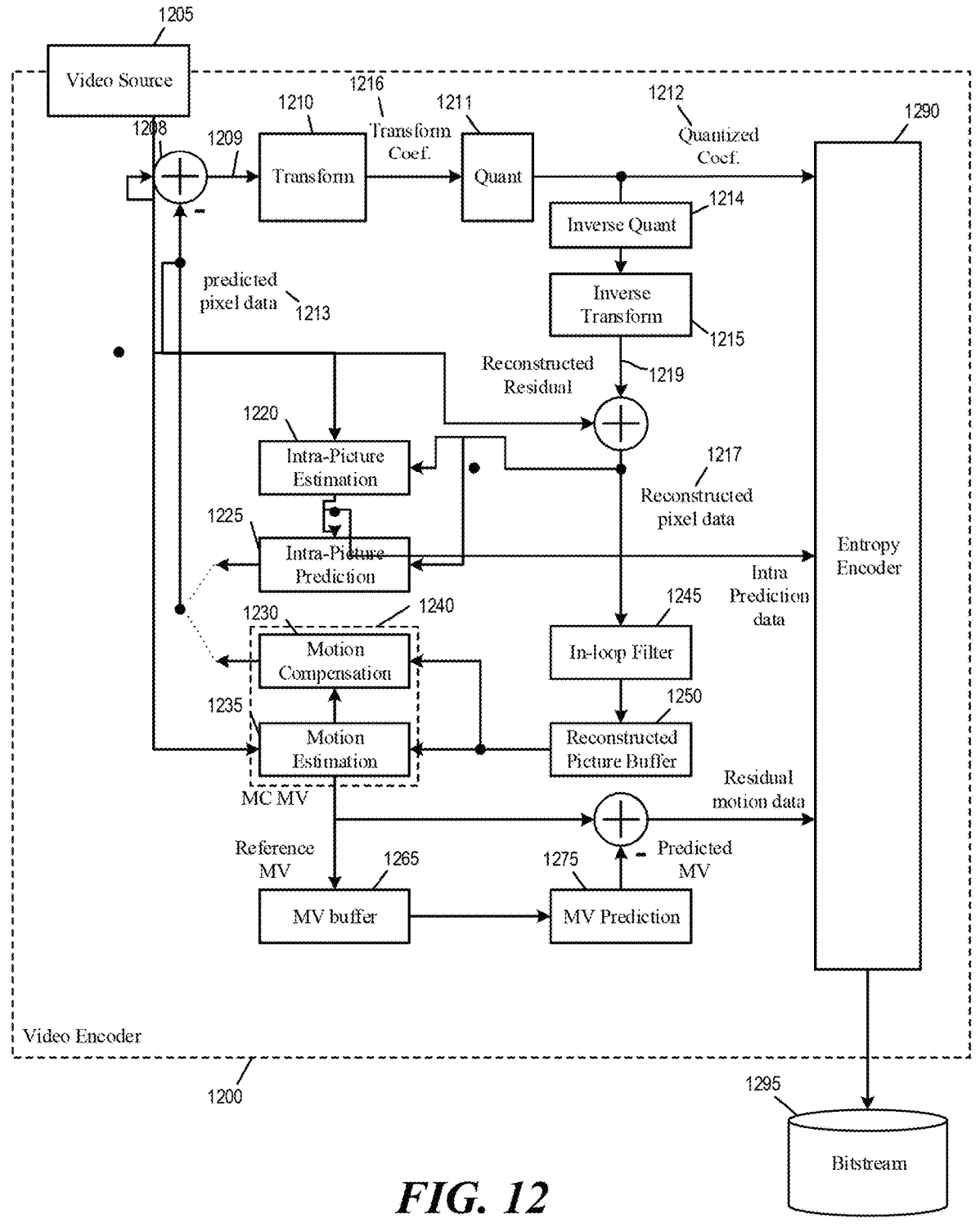
FIG. 12 illustrates an example video encoder that may implement arbitrary partition boundaries.

FIG. 12 illustrates an example video encoder 1200 that may implement arbitrary partition boundaries. As illustrated, the video encoder 1200 receives input video signal from a video source 1205 and encodes the signal into bitstream 1295. The video encoder 1200 has several components or modules for encoding the signal from the video source 1205, at least including some components selected from a transform module 1210, a quantization module 1211, an inverse quantization module 1214, an inverse transform module 1215, an intra-picture estimation module 1220, an intra-prediction module 1225, a motion compensation module 1230, a motion estimation module 1235, an in-loop filter 1245, a reconstructed picture buffer 1250, a MV buffer 1265, and a MV prediction module 1275, and an entropy encoder 1290. The motion compensation module 1230 and the motion estimation module 1235 are part of an inter-prediction module 1240.

In some embodiments, the modules 1210-1290 are modules of software instructions being executed by one or more processing units (e.g., a processor) of a computing device or electronic apparatus. In some embodiments, the modules 1210-1290 are modules of hardware circuits implemented by one or more integrated circuits (ICs) of an electronic apparatus. Though the modules 1210-1290 are illustrated as being separate modules, some of the modules can be combined into a single module.

The video source 1205 provides a raw video signal that presents pixel data of each video frame without compression. A subtractor 1208 computes the difference between the raw video pixel data of the video source 1205 and the predicted pixel data 1213 from the motion compensation module 1230 or intra-prediction module 1225 as prediction residual 1209. The transform module 1210 converts the difference (or the residual pixel data or residual signal 1208) into transform coefficients (e.g., by performing Discrete Cosine Transform, or DCT). The quantization module 1211 quantizes the transform coefficients into quantized data (or quantized coefficients) 1212, which is encoded into the bitstream 1295 by the entropy encoder 1290.

The inverse quantization module 1214 de-quantizes the quantized data (or quantized coefficients) 1212 to obtain transform coefficients, and the inverse transform module 1215 performs inverse transform on the transform coefficients to produce reconstructed residual 1219. The reconstructed residual 1219 is added with the predicted pixel data 1213 to produce reconstructed pixel data 1217. In some embodiments, the reconstructed pixel data 1217 is temporarily stored in a line buffer (not illustrated) for intra-picture prediction and spatial MV prediction. The reconstructed pixels are filtered by the in-loop filter 1245 and stored in the reconstructed picture buffer 1250. In some embodiments, the reconstructed picture buffer 1250 is a storage external to the video encoder 1200. In some embodiments, the reconstructed picture buffer 1250 is a storage internal to the video encoder 1200.

The intra-picture estimation module 1220 performs intra-prediction based on the reconstructed pixel data 1217 to produce intra prediction data. The intra-prediction data is provided to the entropy encoder 1290 to be encoded into bitstream 1295. The intra-prediction data is also used by the intra-prediction module 1225 to produce the predicted pixel data 1213.

The motion estimation module 1235 performs inter-prediction by producing MVs to reference pixel data of previously decoded frames stored in the reconstructed picture buffer 1250. These MVs are provided to the motion compensation module 1230 to produce predicted pixel data.

Instead of encoding the complete actual MVs in the bitstream, the video encoder 1200 uses MV prediction to generate predicted MVs, and the difference between the MVs used for motion compensation and the predicted MVs is encoded as residual motion data and stored in the bitstream 1295.

The MV prediction module 1275 generates the predicted MVs based on reference MVs that were generated for encoding previously video frames, i.e., the motion compensation MVs that were used to perform motion compensation. The MV prediction module 1275 retrieves reference MVs from previous video frames from the MV buffer 1265. The video encoder 1200 stores the MVs generated for the current video frame in the MV buffer 1265 as reference MVs for generating predicted MVs.

The MV prediction module 1275 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 1295 by the entropy encoder 1290.

The entropy encoder 1290 encodes various parameters and data into the bitstream 1295 by using entropy-coding techniques such as context-adaptive binary arithmetic coding (CABAC) or Huffman encoding. The entropy encoder 1290 encodes various header elements, flags, along with the quantized transform coefficients 1212, and the residual motion data as syntax elements into the bitstream 1295. The bitstream 1295 is in turn stored in a storage device or transmitted to a decoder over a communications medium such as a network.

The in-loop filter 1245 performs filtering or smoothing operations on the reconstructed pixel data 1217 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 13:
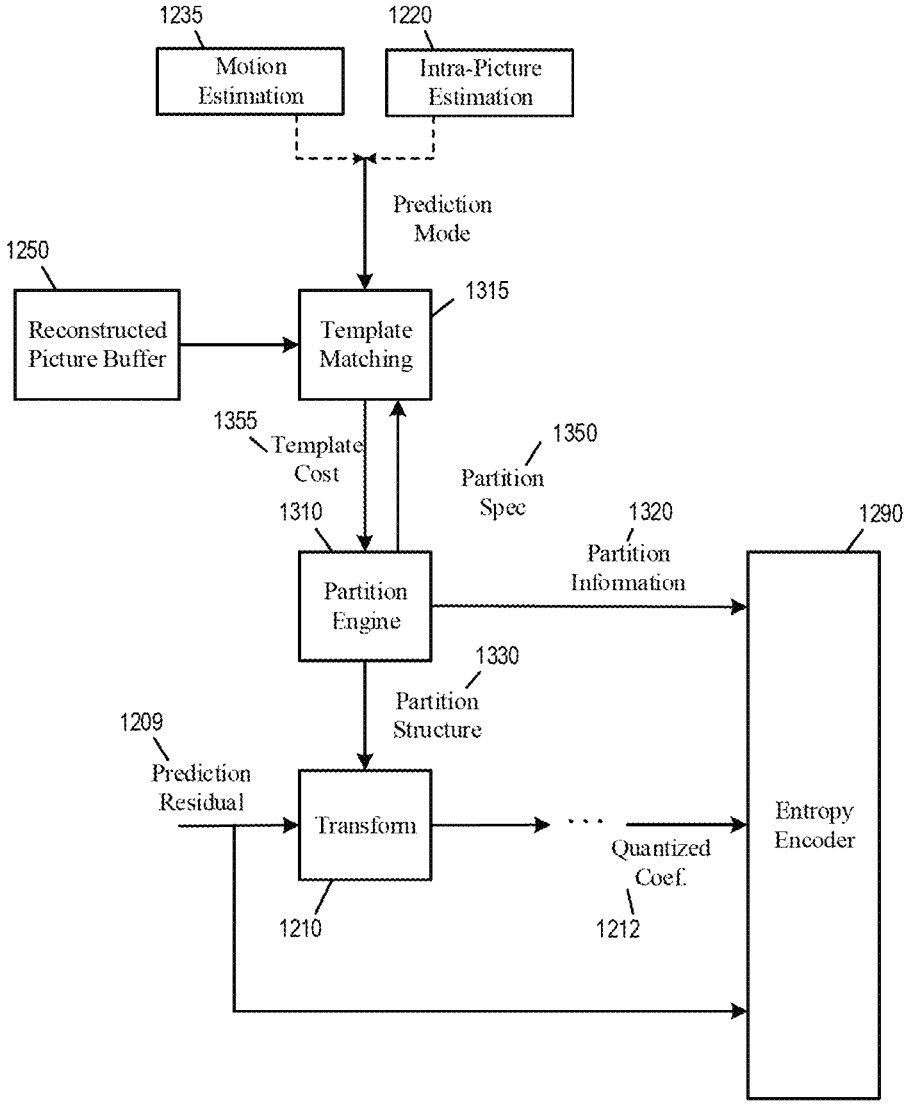
FIG. 13 illustrates portions of the video encoder that implement arbitrary partition boundaries.

FIG. 13 illustrates portions of the video encoder 1200 that implement arbitrary partition boundaries. A partition engine 1310 may generate a set of partitioning information 1320 for the entropy encoder 1290. The entropy encoder 1290 encodes or signals the set of partitioning information 1320 as syntax elements into the bitstream 1295 at different levels of video hierarchy (e.g., sequence, picture, slice, block). The partition engine 1310 also provide partitioning structure 1330 to the transform module 1210 so the transform module may perform transform operations on prediction residual 1209 according to the partitioning structure 1330 to produce quantized coefficients 1212. For example, the transform module 1210 may usc different transform kernels for different parts of an L-shape partition.

The partition engine 1310 may test different partitioning positions by using a template matching engine 1315 to compute costs associated with those different partitioning positions. Specifically, the partitioning engine 1310 may specify a partition 1350 created by a partitioning position to the template matching engine 1315 and receive a template cost 1355 for the specified partition 1350. Based on the template costs received for different partitions created by different partitioning positions, the partition engine 1310 determines a best (lowest cost) partitioning position. The best partitioning position is provided as part of the partition structure 1330.

The template matching engine 1315 retrieves samples stored in the reconstructed picture buffer 1250 to construct a template for the specified partition 1350. The template matching engine 1315 also retrieves reference samples from the reconstructed picture buffer 1250 that correspond to the template, based on the prediction mode assigned to the partition. The prediction mode can be an intra-prediction direction provided by the intra-picture estimation module 1220 or a motion vector provided by the motion estimation module 1235. The template matching module 1315 then compares the constructed template with the retrieved reference samples to generate the template cost 1355 for the specified partition 1350.

In some embodiments, if the partition structure 1330 indicates a partition that does not have a corresponding transform kernel (e.g., not having dimensions that are not power-of-two), the partition's prediction residual 1209 is not transformed (transform skip) and instead provided directly to the entropy encoder 1290 to be encoded and signaled in the bitstream 1295. In some embodiments, the prediction residual 1209 is not signaled (residue skip) either and the encoding of the partition is based entirely on the prediction mode of the partition.

FIG. 14 conceptually illustrates a process 1400 for deriving partitioning position for arbitrary partitioning. In some embodiments, one or more processing units (e.g., a processor) of a computing device implementing the encoder 1200 performs the process 1400 by executing instructions stored in a computer readable medium. In some embodiments, an electronic apparatus implementing the encoder 1200 performs the process 1400.

The encoder receives (at block 1410) data to be encoded as a current block of pixels in a current picture.

The encoder derives (at block 1420) a partitioning structure for splitting the current block by identifying a partitioning position having a lowest cost. The encoder splits (at block 1430) the current block into first and second partitions according to the derived partitioning position. In some embodiments, the encoder also signals the derived partitioning position. The partitioning position may be used to specify a partition boundary for quadtrec (QT), binary trec (BT), or ternary trec (TT). The partitioning structure may specify an offset and an angle of a straight line that splits the current block (e.g., GPM-like).

The width and height of the current block may be power-of-two integers while the partitioning position is at a non-power-of-two integer pixel position. The first partition may be a first rectangular region at a corner of the current block and the second partition is an L-shaped remainder region of the current block minus the first partition. The first partition may be a first rectangular region entirely within the current block and the second partition is a remainder region of the current block that surrounds the first rectangular region on four sides.

In some embodiments, the first and second partitions are respectively associated with first and second templates (e.g., templates 715 and 725) that are constructed based on reconstructed pixels neighboring the current block. Thus, the encoder may identify the partitioning position by computing a first cost based on the first template and a second cost based on the second template and optimizing the partitioning position to minimize a sum of the first and second costs. The encoder may compute the first cost by matching the first template with a first set of reference pixels in the current picture identified by a first intra prediction mode of the first partition, and the second cost by matching the second template with a second set of reference pixels in the current picture identified by a second intra prediction mode of the second partition. The encoder may compute the first cost by matching the first template with a first set of reference pixels in a first reference picture identified by a first motion vector of the first partition and the second cost by matching the second template with a second set of reference pixels in a second reference picture identified by a second motion vector of the second partition.

The encoder encodes (at block 1440) the first and second partitions of the current block. When the partition does not have a corresponding transform kernel (e.g., having dimensions that are not power-of-two), the samples of the first or second partition may be encoded as prediction residuals without being transformed (transform skip), or the samples of the first or second partition may be encoded by prediction without signaling prediction residuals (residue skip).

IV. Example Video Decoder

In some embodiments, an encoder may signal (or generate) one or more syntax element in a bitstream, such that a decoder may parse said one or more syntax element from the bitstream.

Figure 15:
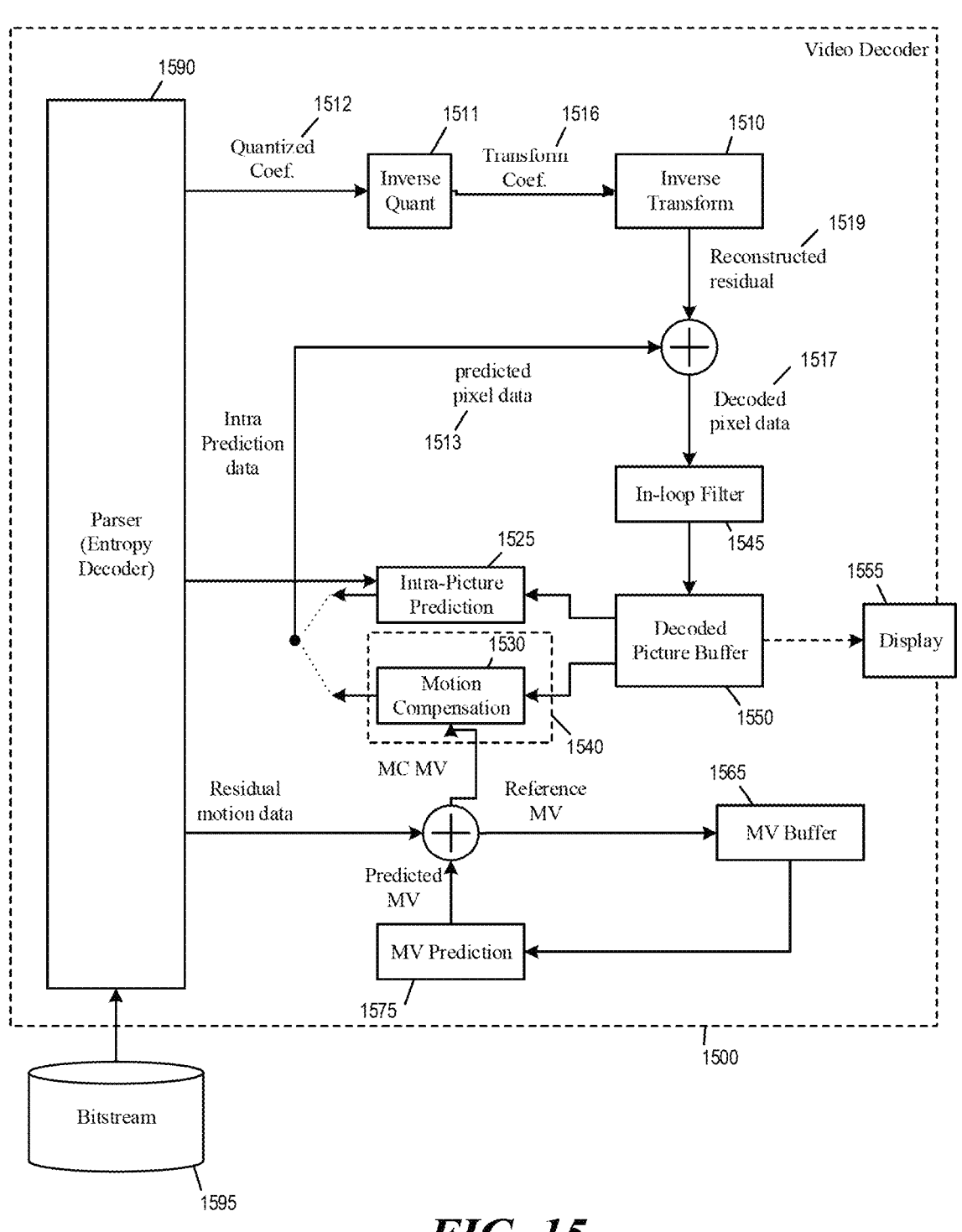
FIG. 15 illustrates an example video decoder that may implement arbitrary partition boundaries.

FIG. 15 illustrates an example video decoder 1500 that may implement arbitrary partition boundaries. As illustrated, the video decoder 1500 is an image-decoding or video-decoding circuit that receives a bitstream 1595 and decodes the content of the bitstream into pixel data of video frames for display. The video decoder 1500 has several components or modules for decoding the bitstream 1595, including some components selected from an inverse quantization module 1511, an inverse transform module 1510, an intra-prediction module 1525, a motion compensation module 1530, an in-loop filter 1545, a decoded picture buffer 1550, a MV buffer 1565, a MV prediction module 1575, and a parser 1590. The motion compensation module 1530 is part of an inter-prediction module 1540.

In some embodiments, the modules 1510-1590 are modules of software instructions being executed by one or more processing units (e.g., a processor) of a computing device. In some embodiments, the modules 1510-1590 are modules of hardware circuits implemented by one or more ICs of an electronic apparatus. Though the modules 1510-1590 are illustrated as being separate modules, some of the modules can be combined into a single module.

The parser 1590 (or entropy decoder) receives the bitstream 1595 and performs initial parsing according to the syntax defined by a video-coding or image-coding standard. The parsed syntax element includes various header elements, flags, as well as quantized data (or quantized coefficients) 1512. The parser 1590 parses out the various syntax elements by using entropy-coding techniques such as context-adaptive binary arithmetic coding (CABAC) or Huffman encoding.

The inverse quantization module 1511 de-quantizes the quantized data (or quantized coefficients) 1512 to obtain transform coefficients, and the inverse transform module 1510 performs inverse transform on the transform coefficients 1516 to produce reconstructed residual signal 1519. The reconstructed residual signal 1519 is added with predicted pixel data 1513 from the intra-prediction module 1525 or the motion compensation module 1530 to produce decoded pixel data 1517. The decoded pixels data are filtered by the in-loop filter 1545 and stored in the decoded picture buffer 1550. In some embodiments, the decoded picture buffer 1550 is a storage external to the video decoder 1500. In some embodiments, the decoded picture buffer 1550 is a storage internal to the video decoder 1500.

The intra-prediction module 1525 receives intra-prediction data from bitstream 1595 and according to which, produces the predicted pixel data 1513 from the decoded pixel data 1517 stored in the decoded picture buffer 1550. In some embodiments, the decoded pixel data 1517 is also stored in a line buffer (not illustrated) for intra-picture prediction and spatial MV prediction.

In some embodiments, the content of the decoded picture buffer 1550 is used for display. A display device 1555 either retrieves the content of the decoded picture buffer 1550 for display directly, or retrieves the content of the decoded picture buffer to a display buffer. In some embodiments, the display device receives pixel values from the decoded picture buffer 1550 through a pixel transport.

The motion compensation module 1530 produces predicted pixel data 1513 from the decoded pixel data 1517 stored in the decoded picture buffer 1550 according to motion compensation MVs (MC MVs). These motion compensation MVs are decoded by adding the residual motion data received from the bitstream 1595 with predicted MVs received from the MV prediction module 1575.

The MV prediction module 1575 generates the predicted MVs based on reference MVs that were generated for decoding previous video frames, e.g., the motion compensation MVs that were used to perform motion compensation. The MV prediction module 1575 retrieves the reference MVs of previous video frames from the MV buffer 1565. The video decoder 1500 stores the motion compensation MVs generated for decoding the current video frame in the MV buffer 1565 as reference MVs for producing predicted MVs.

The in-loop filter 1545 performs filtering or smoothing operations on the decoded pixel data 1517 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 16:
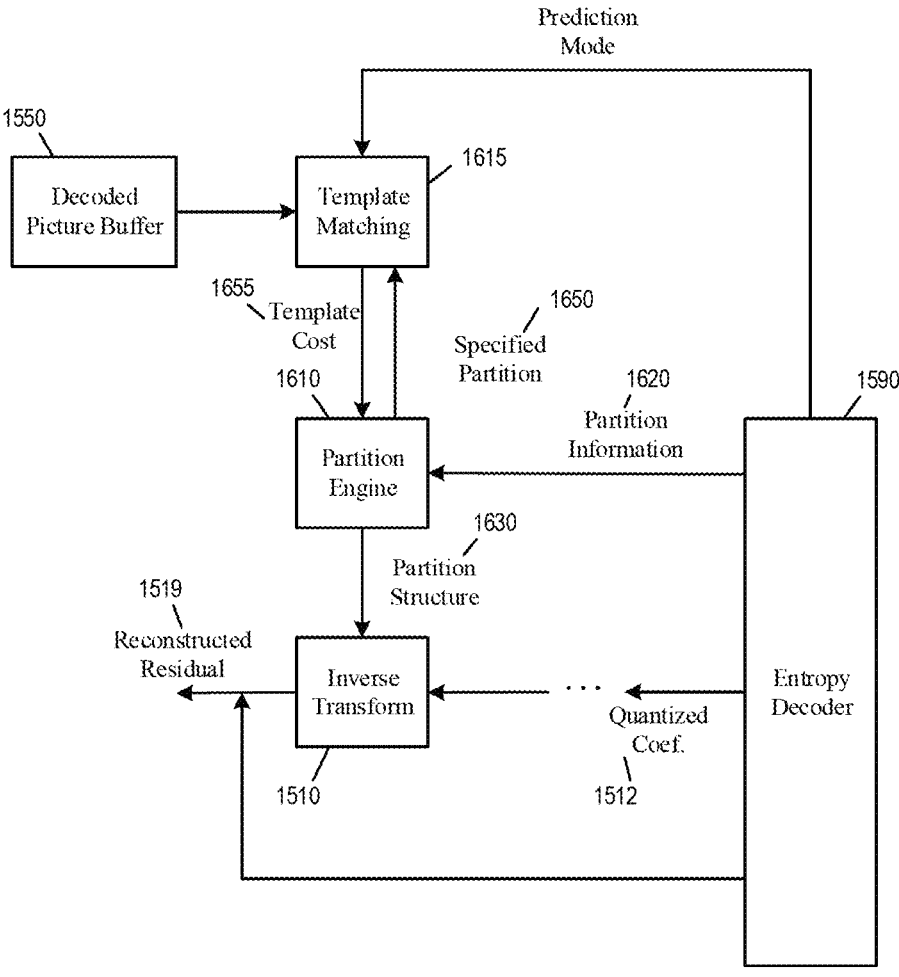
FIG. 16 illustrates portions of the video decoder that implement arbitrary partition boundaries.

FIG. 16 illustrates portions of the video decoder 1500 that implement arbitrary partition boundaries. A partition engine 1610 may receive a set of partitioning information 1620 from the entropy decoder 1590. The entropy decoder 1590 may decode the set of partitioning information 1620 based on syntax elements in the bitstream 1595 at different levels of video hierarchy (e.g., sequence, picture, slice, block). The partition engine 1610 provides partitioning structure 1630 to the inverse transform module 1510 so the inverse transform module may perform inverse transform operations based on the quantized coefficients 1512 to produce the prediction residual 1509 according to the partitioning structure 1630. For example, the inverse transform module 1510 may use different transform kernels for different parts of an L-shape partition.

The partition engine 1610 may test different partitioning positions by using a template matching engine 1615 to compute costs associated with those different partitioning positions. Specifically, the partitioning engine 1610 may specify a partition 1650 created by a partitioning position to the template matching engine 1615 and receive a template cost 1655 for the specified partition 1650. Based on the template costs received for different partitions created by different partitioning positions, the partition engine 1610 determines a best (lowest cost) partitioning position. The best partitioning position is provided as part of the partition structure 1630.

The template matching engine 1615 retrieves samples stored in the decoded picture buffer 1550 to construct a template for the specified partition 1650. The template matching engine 1615 also retrieves reference samples from the decoded picture buffer 1550 that correspond to the template, based on the prediction mode assigned to the partition. The prediction mode can be an intra-prediction direction or a motion vector provided by the entropy decoder 1590. The template matching module 1615 then compares the constructed template with the retrieved reference samples to generate the template cost 1655 for the specified partition 1650.

In some embodiments, if the partition structure 1630 indicates a partition that doesn't have a corresponding transform kernel (e.g., having dimensions that are not power-of-two), the partition's prediction residual 1509 is not transformed (transform skip) and instead received directly from the entropy decoder 1590. In some embodiments, the prediction residual 1509 is not signaled (residue skip) and the decoding of the partition is based entirely on the prediction mode of the partition.

FIG. 17 conceptually illustrates a process 1700 for deriving partitioning position for arbitrary partitioning. In some embodiments, one or more processing units (e.g., a processor) of a computing device implementing the decoder 1500 performs the process 1700 by executing instructions stored in a computer readable medium. In some embodiments, an electronic apparatus implementing the decoder 1500 performs the process 1700.

The decoder receives (at block 1710) data to be decoded as a current block of pixels in a current picture.

The decoder derives (at block 1720) a partitioning structure for splitting the current block by identifying a partitioning position having a lowest cost. The decoder splits (at block 1730) the current block into first and second partitions according to the identified partitioning position. In some embodiments, the decoder may receive the partitioning position from the encoder. The partitioning position may be used to specify a partition boundary for quadtree (QT), binary tree (BT), or ternary tree (TT). The partitioning structure may be specified by an offset and an angle of a straight line that splits the current block (e.g., GPM-like).

The width and height of the current block may be power-of-two integers while the partitioning position is at a non-power-of-two integer pixel position. The first partition may be a first rectangular region at a corner of the current block and the second partition is an L-shaped remainder region of the current block minus the first partition. The first partition may be a first rectangular region entirely within the current block and the second partition is a remainder region of the current block that surrounds the first rectangular region on four sides.

In some embodiments, the first and second partitions are respectively associated with first and second templates (e.g., templates 715 and 725) that are constructed based on reconstructed pixels neighboring the current block. Thus, the decoder may identify the partitioning position by computing a first cost based on the first template and a second cost based on the second template and optimizing the partitioning position to minimize a sum of the first and second costs. The decoder may compute the first cost by matching the first template with a first set of reference pixels in the current picture identified by a first intra prediction mode of the first partition, and the second cost by matching the second template with a second set of reference pixels in the current picture identified by a second intra prediction mode of the second partition. The decoder may compute the first cost by matching the first template with a first set of reference pixels in a first reference picture identified by a first motion vector of the first partition and the second cost by matching the second template with a second set of reference pixels in a second reference picture identified by a second motion vector of the second partition.

The decoder reconstructs (at block 1740) the first and second partitions of the current block. When the partition does not have a corresponding transform kernel (e.g., having dimensions that are not power-of-two), the samples of the first or second partition may be coded as prediction residuals without being transformed (transform skip), or the samples of the first or second partition may be coded by prediction without signaling prediction residuals (residue skip). In theses instances, the decoder may bypass inverse transform operations. The decoder may then provide the reconstructed current block for display as part of the reconstructed current picture.

V. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 18:
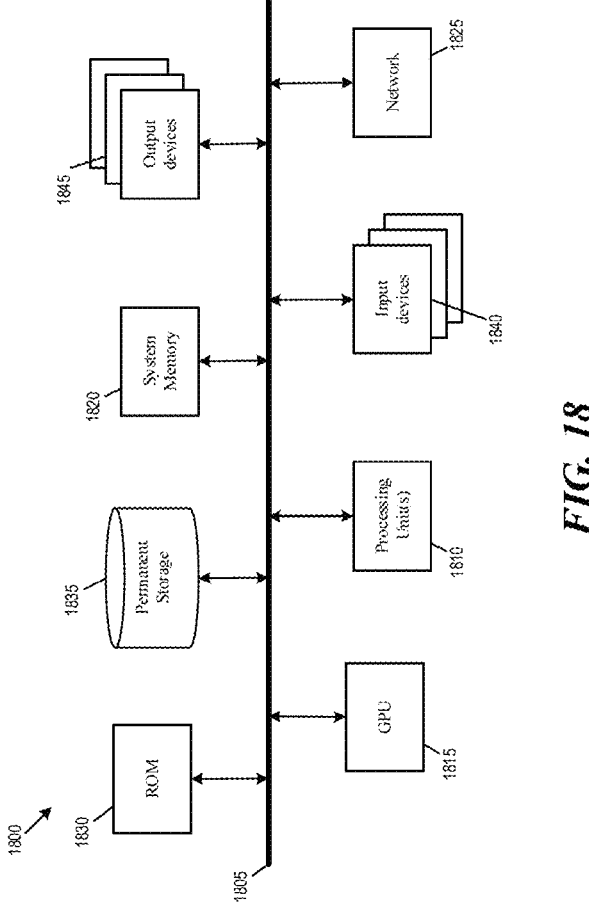
FIG. 18 conceptually illustrates an electronic system with which some embodiments of the present disclosure are implemented.

FIG. 18 conceptually illustrates an electronic system 1800 with which some embodiments of the present disclosure are implemented. The electronic system 1800 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1800 includes a bus 1805, processing unit(s) 1810, a graphics-processing unit (GPU) 1815, a system memory 1820, a network 1825, a read-only memory 1830, a permanent storage device 1835, input devices 1840, and output devices 1845.

The bus 1805 collectively represents all system, peripheral, and chipset buses that communicatively connect the numerous internal devices of the electronic system 1800. For instance, the bus 1805 communicatively connects the processing unit(s) 1810 with the GPU 1815, the read-only memory 1830, the system memory 1820, and the permanent storage device 1835.

From these various memory units, the processing unit(s) 1810 retrieves instructions to execute and data to process in order to execute the processes of the present disclosure. The processing unit(s) may be a single processor or a multi-core processor in different embodiments. Some instructions are passed to and executed by the GPU 1815. The GPU 1815 can offload various computations or complement the image processing provided by the processing unit(s) 1810.

The read-only-memory (ROM) 1830 stores static data and instructions that are used by the processing unit(s) 1810 and other modules of the electronic system. The permanent storage device 1835, on the other hand, is a read-and-write memory device. This device is a non-volatile memory unit that stores instructions and data even when the electronic system 1800 is off. Some embodiments of the present disclosure use a mass-storage device (such as a magnetic or optical disk and its corresponding disk drive) as the permanent storage device 1835.

Other embodiments use a removable storage device (such as a floppy disk, flash memory device, etc., and its corresponding disk drive) as the permanent storage device. Like the permanent storage device 1835, the system memory 1820 is a read-and-write memory device. However, unlike storage device 1835, the system memory 1820 is a volatile read-and-write memory, such a random access memory. The system memory 1820 stores some of the instructions and data that the processor uses at runtime. In some embodiments, processes in accordance with the present disclosure are stored in the system memory 1820, the permanent storage device 1835, and/or the read-only memory 1830. For example, the various memory units include instructions for processing multimedia clips in accordance with some embodiments. From these various memory units, the processing unit(s) 1810 retrieves instructions to execute and data to process in order to execute the processes of some embodiments.

The bus 1805 also connects to the input and output devices 1840 and 1845. The input devices 1840 enable the user to communicate information and select commands to the electronic system. The input devices 1840 include alphanumeric keyboards and pointing devices (also called "cursor control devices"), cameras (e.g., webcams), microphones or similar devices for receiving voice commands, etc. The output devices 1845 display images generated by the electronic system or otherwise output data. The output devices 1845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 18, bus 1805 also couples electronic system 1800 to a network 1825 through a network adapter (not shown). In this manner, the computer can be a part of a network of computers (such as a local area network ("LAN"), a wide area network ("WAN"), or an Intranet, or a network of networks, such as the Internet. Any or all components of electronic system 1800 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 14 and FIG. 17) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method comprising:
receiving data for a block of pixels to be encoded or decoded as a current block of a current picture of a video;
deriving a partitioning structure for splitting the current block by identifying a partitioning position based on a set of costs from each partitioning position;
splitting the current block into first and second partitions according to the identified partitioning position, wherein the first partition is a first rectangular region entirely within the current block and the second partition is a remainder region of the current block that surrounds the first rectangular region on four sides; and
encoding or decoding the first and second partitions of the current block.

2. The video coding method of claim 1, wherein width and height of the current block are power-of-two integers and the partitioning position is at a non-power-of-two integer pixel position.

3. The video coding method of claim 1, wherein samples of the first or second partition are coded as prediction residuals without being transformed.

4. The video coding method of claim 1, wherein samples of the first or second partition are coded by prediction without signaling prediction residuals.

5. The video coding method of claim 1, wherein the first and second partitions are respectively associated with first and second templates that are constructed based on reconstructed pixels neighboring the current block, wherein identifying the partitioning position comprises:
computing a first cost based on the first template and a second cost based on the second template;
optimizing the partitioning position to minimize a sum of the first and second costs.

6. The video coding method of claim 5, wherein:
computing the first cost comprises matching the first template with a first set of reference pixels in the current picture identified by a first intra prediction mode of the first partition; and
computing the second cost comprises matching the second template with a second set of reference pixels in the current picture identified by a second intra prediction mode of the second partition.

7. The video coding method of claim 5, wherein:
computing the first cost comprises matching the first template with a first set of reference pixels in a first reference picture identified by a first motion vector of the first partition; and
computing the second cost comprises matching the second template with a second set of reference pixels in a second reference picture identified by a second motion vector of the second partition.

8. The video coding method of claim 1, wherein the first partition is a first rectangular region at a corner of the current block and the second partition is an L-shaped remainder region of the current block minus the first partition.

9. The video coding method of claim 1, further comprising signaling the identified partitioning position.

10. An electronic apparatus comprising:
a video coder circuit configured to perform operations comprising:
receiving data for a block of pixels to be encoded or decoded as a current block of a current picture of a video;

deriving a partitioning structure for splitting the current block by identifying a partitioning position having a lowest cost;

splitting the current block into first and second partitions according to the identified partitioning position, wherein the first partition is a first rectangular region entirely within the current block and the second partition is a remainder region of the current block that surrounds the first rectangular region on four sides; and encoding or decoding the first and second partitions of the current block.

11. A video decoding method comprising:

receiving data for a block of pixels to be decoded as a current block of a current picture of a video;

deriving a partitioning structure for splitting the current block by identifying a partitioning position having a lowest cost;

splitting the current block into first and second partitions according to the identified partitioning position, wherein the first partition is a first rectangular region entirely within the current block and the second partition is a remainder region of the current block that surrounds the first rectangular region on four sides; and reconstructing the first and second partitions of the current block.

12. A video encoding method comprising:

receiving data for a block of pixels to be encoded as a current block of a current picture of a video;

deriving a partitioning structure for splitting the current block by identifying a partitioning position having a lowest cost;

splitting the current block into first and second partitions according to the identified partitioning position, wherein the first partition is a first rectangular region entirely within the current block and the second partition is a remainder region of the current block that surrounds the first rectangular region on four sides; and encoding the first and second partitions of the current block.

* * * * *